United States Patent
Sridhara et al.

(10) Patent No.: US 11,115,902 B2
(45) Date of Patent: Sep. 7, 2021

(54) BROADCAST ISOCHRONOUS RELAY OVER ESCO

(71) Applicant: QUALCOMM Incorporated, San Diego, CA (US)

(72) Inventors: Srivathsa Sridhara, Bhadravathi (IN); Vishal Agarwal, Ramnagar (IN)

(73) Assignee: QUALCOMM INCORPORATED, San Diego, CA (US)

( * ) Notice: Subject to any disclaimer, the term of this patent is extended or adjusted under 35 U.S.C. 154(b) by 89 days.

(21) Appl. No.: 16/128,235

(22) Filed: Sep. 11, 2018

(65) Prior Publication Data

US 2020/0084697 A1    Mar. 12, 2020

(51) Int. Cl.
*H04W 48/10* (2009.01)
*H04W 4/80* (2018.01)
*H04B 7/155* (2006.01)
*H04L 12/18* (2006.01)
*H04L 29/06* (2006.01)

(52) U.S. Cl.
CPC ........ *H04W 48/10* (2013.01); *H04B 7/15592* (2013.01); *H04L 12/1877* (2013.01); *H04L 69/08* (2013.01); *H04W 4/80* (2018.02); *H04L 2212/00* (2013.01)

(58) Field of Classification Search
CPC ......... H04W 4/80; H04W 4/00; H04W 4/008; H04W 48/10; H04W 56/0025; H04W 56/00; H04W 72/1215; H04W 72/1242; H04W 72/0446; H04W 72/12; H04W 88/06; H04W 84/18; H04W 84/12; H04W 76/11; H04W 16/14; H04L 5/0055; H04L 63/08; H04L 69/08; H04L 12/1877; H04L 12/40058; H04L 12/40; H04L 12/28; H04L 12/54; H04L 67/30; H04L 41/082; H04B 7/15592; H04B 7/00
See application file for complete search history.

(56) References Cited

U.S. PATENT DOCUMENTS

2003/0013411 A1* 1/2003 Uchiyama ............. H04M 1/725
                                                          455/40
2004/0082343 A1* 4/2004 Kim ................... H04M 1/72412
                                                          455/456.1

(Continued)

*Primary Examiner* — Un C Cho
*Assistant Examiner* — Rasha K Fayed
(74) *Attorney, Agent, or Firm* — Holland & Hart LLP

(57) ABSTRACT

Methods, systems, and devices for wireless communications are described. A device may communicate with a second device, which may be a Bluetooth device, using a relay profile (e.g., a low energy (LE) isochronous (ISO) relay profile). In accordance with broadcast discovery signaling by the device and decisions made by the Bluetooth device, the device may synchronize to a broadcast isochronous stream (BIS) from another device. The device may then establish a communication link with the second device (e.g., a synchronous connection oriented (SCO) link, an enhanced synchronous connection oriented (eSCO) link, an asynchronous connection less (ACL) link) to be used for relay of the BIS. The device may then convert, based on the relay profile, broadcast isochronous data packets of the BIS to SCO packets, eSCO packets, and/or ACL packets, and relay the converted packets to the second device via the established communication link.

16 Claims, 10 Drawing Sheets

(56) References Cited

U.S. PATENT DOCUMENTS

| | | | | |
|---|---|---|---|---|
| 2006/0128308 A1* | 6/2006 | Michael | ............... | H04W 24/00 |
| | | | | 455/41.2 |
| 2006/0194600 A1* | 8/2006 | Palin | .................... | H04W 16/14 |
| | | | | 455/512 |
| 2006/0270347 A1* | 11/2006 | Ibrahim | ................ | H04H 20/08 |
| | | | | 455/41.2 |
| 2009/0137206 A1* | 5/2009 | Sherman | .............. | H04W 16/14 |
| | | | | 455/41.2 |
| 2009/0219904 A1* | 9/2009 | Khairmode | ........... | H04B 15/02 |
| | | | | 370/338 |
| 2010/0008338 A1* | 1/2010 | Tsfati | .................... | H04B 1/406 |
| | | | | 370/338 |
| 2010/0020729 A1* | 1/2010 | Walley | ............... | H04M 1/6066 |
| | | | | 370/277 |
| 2014/0349576 A1* | 11/2014 | Lo | ...................... | H04M 1/6066 |
| | | | | 455/41.2 |
| 2017/0244576 A1* | 8/2017 | Batra | ............... | H04W 56/0025 |
| 2018/0084456 A1* | 3/2018 | Gostev | ................ | H04W 84/18 |

\* cited by examiner

BROADCAST ISOCHRONOUS RELAY OVER ESCO

BACKGROUND

The following relates generally to wireless communications, and more specifically to broadcast isochronous relay for Bluetooth.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or wireless devices. The AP may be coupled to a network, such as the Internet, and may enable a wireless device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, wireless devices may monitor broadcast streams for information broadcast by another wireless devices (e.g., an AP). Such broadcast information may include, for example, emergency information, security alerts, local environment information (e.g., sports score updates, shopping mall sales, airport information), etc. However, some wireless devices (e.g., some Bluetooth devices) may not support certain types of broadcast communications (e.g., broadcast isochronous streams (BIS)). Improved techniques for such communications may thus be desired.

SUMMARY

The described techniques relate to improved methods, systems, devices, or apparatuses that support broadcast isochronous relay for Bluetooth. Generally, the described techniques provide for establishment of a broadcast isochronous relay profile (e.g., a low energy (LE) isochronous (ISO) relay profile) between a device (e.g., a wireless mobile device) and a second device, which may be a paired device (e.g., a Bluetooth headset). The broadcast isochronous relay profile may provide for broadcast parameter configuration, conversion of broadcast isochronous data packets to a format supported by the paired device, establishment of communication links between the device and the paired device (e.g., for communication of the converted broadcast isochronous data packets), etc.

For example, a device may establish a communication link with a Bluetooth device using a relay profile (e.g., an LE ISO relay profile). The device may monitor for certain broadcasts based on broadcast configuration parameters from an application on the device, from the Bluetooth device, or both. The device may receive a broadcast synchronization indication from a second device (e.g., from some broadcasting device, such as an access point (AP)), and may transmit, using the relay profile, an indication of broadcast discovery to the Bluetooth device. The indication of broadcast discovery may include some of the information of the broadcast synchronization indication, such as the broadcast type, identification of the broadcaster, etc. The Bluetooth device may make a policy decision (e.g., a decision whether or not to accept the broadcast, based on the information of the broadcast discovery indication), and transmit a message (e.g., a broadcast accept message, a broadcast reject message) to the device.

In cases where the Bluetooth device indicates a broadcast accept message to the device, the device may synchronize, based on the received broadcast synchronization indication, to a broadcast isochronous stream (BIS) from the second device. Further, the device may establish a communication link with the other device, which may be but is not limited to a Bluetooth device (e.g., a synchronous connection oriented (SCO) link, an enhanced synchronous connection oriented (eSCO) link, an asynchronous connection less (ACL) link) to be used for relay of the BIS. The device may then convert, based on the relay profile, broadcast isochronous data packets of the BIS to SCO packets, eSCO packets, and/or ACL packets, and relay the converted packets to the Bluetooth device via the established communication link. In some cases, the relay profile may establish isochronous data packet conversion methods, the type of packet the broadcast isochronous data packets are to be converted to (e.g., SCO, eSCO, ACL), the type of link established between the device and the Bluetooth device, etc. For example, in some cases, a broadcast isochronous data packet may be decoded and the broadcast information (e.g., identified based on the decoding) may be encoded according to a supported relay format (e.g., a format supported by the Bluetooth device). Additionally or alternatively, a broadcast isochronous data packet may be fragmented into two or more supported relay packets, two or more broadcast isochronous data packets may be reassembled into a single supported relay packet, etc.

A method of wireless communication at a device is described. The method may include establishing a communication link with a Bluetooth device using a relay profile and receiving a broadcast isochronous data packet from a second device. The method may further include converting, based on the relay profile, the broadcast isochronous data packet to a SCO packet, an eSCO packet, or an ACL packet, and transmitting the SCO packet, the eSCO packet, or the ACL packet to the Bluetooth device based on the conversion.

An apparatus for wireless communication at a device is described. The apparatus may include a processor, memory in electronic communication with the processor, and instructions stored in the memory. The instructions may be executable by the processor to cause the apparatus to establish a communication link with a Bluetooth device using a relay profile, receive a broadcast isochronous data packet from a second device, convert, based on the relay profile, the broadcast isochronous data packet to a SCO packet, an eSCO packet, or an ACL packet, and transmit the SCO packet, the eSCO packet, or the ACL packet to the Bluetooth device based on the conversion.

Another apparatus for wireless communication at a device is described. The apparatus may include means for establishing a communication link with a Bluetooth device using a relay profile, receiving a broadcast isochronous data packet from a second device, converting, based on the relay profile, the broadcast isochronous data packet to a SCO packet, an eSCO packet, or an ACL packet, and transmitting the SCO packet, the eSCO packet, or the ACL packet to the Bluetooth device based on the conversion.

A non-transitory computer-readable medium storing code for wireless communication at a device is described. The code may include instructions executable by a processor to establish a communication link with a Bluetooth device using a relay profile, receive a broadcast isochronous data packet from a second device, convert, based on the relay profile, the broadcast isochronous data packet to a SCO packet, an eSCO packet, or an ACL packet, and transmit the SCO packet, the eSCO packet, or the ACL packet to the Bluetooth device based on the conversion.

In some examples of the method, apparatuses, and non-transitory computer-readable medium described herein, converting the broadcast isochronous data packet to the SCO packet, the eSCO packet, or the ACL packet may include operations, features, means, or instructions for decoding the received broadcast isochronous data packet, identifying broadcast information based on the decoding and encoding the broadcast information based on a SCO format, an eSCO format, or an ACL format, where the SCO packet, the eSCO packet, or the ACL packet may be based on the encoding.

In some examples of the method, apparatuses, and non-transitory computer-readable medium described herein, the operations, features, means, or instructions for converting the broadcast isochronous data packet to the SCO packet, the eSCO packet, or the ACL packet may include operations, features, means, or instructions for fragmenting the received broadcast isochronous data packet, where the SCO packet, the eSCO packet, or the ACL packet may be based on the fragmenting. In some examples of the method, apparatuses, and non-transitory computer-readable medium described herein, the operations, features, means, or instructions for converting the broadcast isochronous data packet to the SCO packet, the eSCO packet, or the ACL packet may include operations, features, means, or instructions for combining the received broadcast isochronous data packet with one or more other broadcast isochronous data packets, where the SCO packet, the eSCO packet, or the ACL packet may be based on the combining.

Some examples of the method, apparatuses, and non-transitory computer-readable medium described herein may further include operations, features, means, or instructions for receiving one or more broadcast parameters from a mobile application of the device, or the Bluetooth device, or both, where the broadcast isochronous data packet may be converted into the SCO packet, the eSCO packet, or the ACL packet based on the one or more broadcast parameters.

In some examples of the method, apparatuses, and non-transitory computer-readable medium described herein, the one or more broadcast parameters include one or more types of broadcast supported by the Bluetooth device, one or more broadcast streams of interest to the Bluetooth device, one or more broadcast configuration parameters, or some combination thereof.

Some examples of the method, apparatuses, and non-transitory computer-readable medium described herein may further include operations, features, means, or instructions for receiving a broadcast synchronization indication from the second device, transmitting, using the relay profile, an indication of a broadcast discovery to the Bluetooth device based on the broadcast synchronization indication and receiving a broadcast accept message or a broadcast reject message from the Bluetooth device based on the transmitted indication of the broadcast discovery.

Some examples of the method, apparatuses, and non-transitory computer-readable medium described herein may further include operations, features, means, or instructions for establishing an SCO communication link, an eSCO communication link, or an ACL communication link with the Bluetooth device based on the received broadcast accept message, where the SCO packet, the eSCO packet, or the ACL packet may be transmitted based on the establishment.

Some examples of the method, apparatuses, and non-transitory computer-readable medium described herein may further include operations, features, means, or instructions for synchronizing to a BIS from the second device based on the received broadcast accept message and the received broadcast synchronization indication, where the broadcast isochronous data packet may be received based on the synchronization.

In some examples of the method, apparatuses, and non-transitory computer-readable medium described herein, the broadcast synchronization indication may include operations, features, means, or instructions for a broadcast type, one or more broadcast configuration parameters, one or more BIS synchronization parameters, one or more encryption parameters, or some combination thereof and where the indication of the broadcast discovery includes: the broadcast type, the one or more broadcast configuration parameters, an identifier of the second device, or some combination thereof.

In some examples of the method, apparatuses, and non-transitory computer-readable medium described herein, the operations, features, means, or instructions for converting the broadcast isochronous data packet to the SCO packet, the eSCO packet, or the ACL packet may include operations, features, means, or instructions for converting, at a host of the device, the broadcast isochronous data packet to the SCO packet, the eSCO packet, or the ACL packet based on the relay profile. In some examples of the method, apparatuses, and non-transitory computer-readable medium described herein, the operations, features, means, or instructions for converting the broadcast isochronous data packet to the SCO packet, the eSCO packet, or the ACL packet may include operations, features, means, or instructions for instructing, by the host of the device, a controller of the device to convert the broadcast isochronous data packet to the SCO packet, the eSCO packet, or the ACL packet via at least one command based on the relay profile.

DETAILED DESCRIPTION

Figure 1:
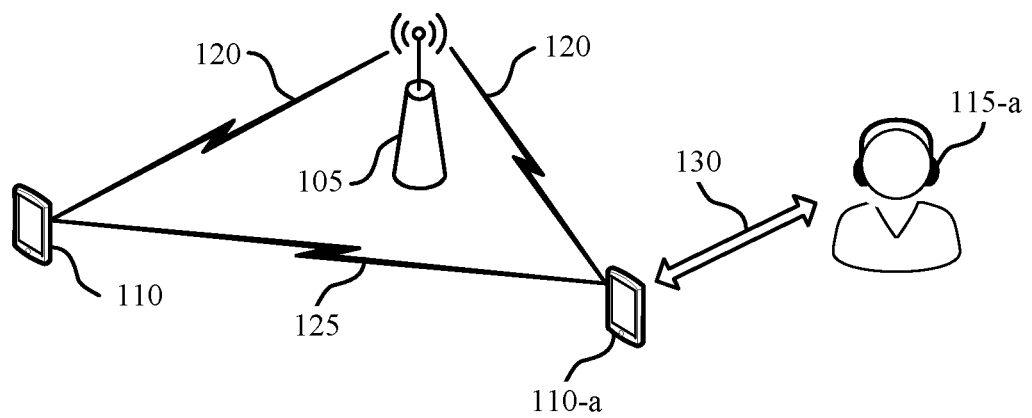
FIG. 1 illustrates an example of a system for wireless communications that supports broadcast isochronous relay for Bluetooth in accordance with aspects of the present disclosure.

In some wireless communication systems, wireless devices may be in electronic communication with each other, where one device (e.g., a broadcaster) may transmit or broadcast data packets (e.g., voice and/or audio data packets) to one or more other wireless devices. Broadcast information may include, for example, emergency signals, security alerts, local notifications, etc. broadcast from an access point (AP). Further, some wireless devices within the wireless communications system may also be a part of a wireless personal area network (PAN), and may engage in short range wireless communications with other devices in communication with (e.g., paired to) the wireless device. For example, a wireless device (e.g., a wireless mobile phone) and a second device, which may be a Bluetooth device (e.g., a Bluetooth headset), may establish a synchronous connection oriented (SCO) link (e.g., for real-time narrow band signals), an enhanced synchronous connection oriented (eSCO) link (e.g., for real-time narrow band signals with possible retransmission), an asynchronous connection less (ACL) link (e.g., for High quality audio/video data), etc. In some cases, it may be desirable for such devices to be able to similarly receive information broadcast within the wireless communications system.

In some cases, however, such Bluetooth devices may not support certain broadcast channels. For example, an AP may broadcast information (e.g., a broadcast isochronous stream (BIS)) over a broadcast isochronous channel. Some Bluetooth devices may not support communication of isochronous data (e.g., due to hardware constraints and/or other factors or conditions). Advertising extensions and/or hardware changes to enable a Bluetooth device to support isochronous channels and BIS data formatting may be impractical to implement in existing Bluetooth devices (e.g., as development cost and effort may be significant to enhance the capabilities of the Bluetooth device). Further, manufacturing of new Bluetooth devices with hardware supporting reception of BIS may be associated with additional hardware costs.

The described techniques provide for wireless device (e.g., handset) relay of BIS from a broadcaster to a Bluetooth device (e.g., to a Bluetooth headset that does not support BIS formatting). A wireless device supporting BIS formatting may establish a profile level connection (e.g., a low energy (LE) isochronous (ISO) relay profile) with a Bluetooth device for relay of converted broadcast isochronous data packets. For example, the wireless device may convert broadcast isochronous data packets of a BIS to a format supported by the Bluetooth device (e.g., into SCO packets, eSCO packets, ACL packets, advanced audio distribution profile (A2DP) packets), and relay the converted packets to the Bluetooth device over a link supported by the Bluetooth device (e.g., a SCO link, eSCO link, or ACL link established according to the relay profile).

The relay profile level connection may further be used to inform the wireless device of the broadcasts the receiving Bluetooth device is interested in, the communication formatting specifications of the Bluetooth device, etc. For example, a mobile application of the wireless device and/or the Bluetooth device may configure broadcast parameters that indicate one or more types of broadcast the Bluetooth device is configured for, link configurations by the Bluetooth device for reception, and/or any other information pertaining to the parameters of the Bluetooth device to use or receive the data broadcast by the broadcaster. The wireless device may then scan for broadcasts, according to the broadcast configuration parameters, for relay to the Bluetooth device. The wireless device may receive a synchronization indication (e.g., including broadcast identification information, BIS synchronization information, etc.) from a device, such as a broadcaster, and may forward some or all of the received information to the Bluetooth device in an indication of broadcast discovery. Based on the broadcast discovery indication, the receiving Bluetooth device may accept or reject the broadcast. In some cases, the Bluetooth device may accept the broadcast and transmit an accept broadcast to the wireless device. The wireless device may then synchronize with the accepted broadcast (e.g., with the BIS associated with the broadcast synchronization information) and may establish a relay link that the Bluetooth device is capable of receiving on, such as an eSCO link or ACL link.

The wireless device may synchronize to the BIS and receive broadcast isochronous data packets from the broadcaster. In accordance with the LE ISO relay profile (e.g., according to the broadcast configuration parameters, the established link with the receiving Bluetooth device), the wireless device may convert the broadcast isochronous data packets into a format supported by the Bluetooth device and relay the converted packets over the established relay link. For example, the wireless device may convert a BIS data packet into a format supported by the Bluetooth device, such as an SCO packet, an eSCO packet, or an ACL packet. The wireless device may then transmit the converted data packet to the receiving Bluetooth device over the established eSCO or ACL link, where the receiving Bluetooth device may now be capable of receiving and processing the converted broadcast isochronous data packet (e.g., the Bluetooth device may effectively receive relayed information broadcast by the broadcaster).

Aspects of the disclosure are initially described in the context of a wireless communications system. Examples of devices supporting broadcast isochronous relay, as well as example process flows for implementing the discussed techniques are then described. Aspects of the disclosure are further illustrated by and described with reference to apparatus diagrams, system diagrams, and flowcharts that relate to broadcast isochronous relay for Bluetooth.

FIG. 1 illustrates a system 100 (e.g., which may include to refer to or include a wireless personal area network (PAN), a wireless local area network (WLAN), a Wi-Fi network) configured in accordance with various aspects of the present disclosure. The system 100 may include an AP 105, devices 110, and paired devices 115 implementing WLAN communications (e.g., Wi-Fi communications) and/or Bluetooth communications. For example, devices 110 may include cell phones, mobile stations, personal digital assistant (PDAs), other handheld devices, netbooks, notebook computers, tablet computers, laptops, or some other suitable terminology. Paired devices 115 may include Bluetooth devices capable of pairing with other Bluetooth devices (e.g., devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices 110 and paired devices 115 (e.g., between mobile phones, computers, digital cameras, wireless headsets, speakers, keyboards, mice or other input peripherals, and similar devices). Bluetooth systems (e.g., aspects of system 100) may be organized using a master-slave relationship employing a time division duplex protocol having, for example, defined time slots of 625 mu secs, in which transmission alternates between the master device (e.g., a device 110) and one or more slave devices (e.g., paired devices 115). In some cases, a device 110 may generally refer to a master device, and a paired device 115 may refer to a slave device in a PAN. As such, in some cases, a device may be referred to as either a device 110 or a paired device 115 based on the Bluetooth role configuration of the device. That is, designation of a device as either a device 110 or a paired device 115 may not necessarily indicate a distinction in device capability, but rather may refer to or indicate roles held by the device in the PAN. Generally, device 110 may refer to a wireless communication device capable of wirelessly exchanging data signals with another device, and paired device 115 may refer to a device operating in a slave role, or to a short-range wireless device capable of exchanging data signals with the wireless device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., device 110-a) implements an audio source device (SRC) role and another device (e.g., paired device 115-a) implements an audio sink device (SNK) role.

For a commercial Bluetooth device that implements one role in a profile to function properly, another device that implements the corresponding role should be present within the radio range of the first device. For example, in order for an HF device such as a Bluetooth headset to function according to the HFP, a device implementing the AG role (e.g., a cell phone) should be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two Bluetooth devices (e.g., between a device 110-a and a paired device 115-a) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., paired device 115-a) are acknowledged, and may be retransmitted if not acknowledged during a retransmission window. In addition, audio may be streamed between the device 110-a and paired device 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power parameters), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a device 110 (e.g., a wireless device) may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100. AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a paired device 115 may originate from a WLAN. For example, in some cases, device 110-a may receive audio from an AP 105 (e.g., via WLAN communications), and the device 110-a may then implement the described techniques to relay or pass the audio to the paired device 115-a (e.g., via Bluetooth communications). In some cases, certain types of Bluetooth communications (e.g., high quality or high definition (HD) Bluetooth) may use enhanced quality of service. For example, in some cases, delay-sensitive Bluetooth traffic may have higher priority than WLAN traffic.

In some cases, a paired device 115-a (e.g., a Bluetooth headset) may be compatible with certain data formats and wireless connections (e.g., based on a compatibility relating to the headset's 115-a Bluetooth profiles). For example, the paired device 115-a may be compatible with SCO data packets, eSCO data packets, and ACL data packets and may be compatible with eSCO links and ACL links. In some cases, the paired device 115-a may not support reception of BIS. For example, to receive BIS, the Bluetooth controller on paired device 115-a may need to support isochronous channels (e.g., and support in the Bluetooth controller may also be dependent on other features, such as advertising extension, and may lead to hardware changes). For example, some Bluetooth devices (e.g., paired device 115-a) may not support generic audio millimeter wave (GAM) software implementations (e.g., for processing of broadcast isochronous data), as some Bluetooth devices may not have hardware capable of supporting GAM or understanding packets corresponding to BIS. However, some wireless devices (e.g., device 110-a) may support isochronous communications features.

In accordance with the described techniques, a device 110-a may communicate with a Bluetooth device using a relay profile (e.g., a LE ISO relay profile). The device may monitor for certain broadcasts (e.g., from a broadcaster, such as AP 105) based on broadcast configuration parameters from an application on the device 110-a, from the paired device 115-a, or both (e.g., some broadcast configuration parameters may be received from the paired device 115-a and some broadcast configuration parameters may originate from an application of the device 110-a). In accordance with broadcast discovery signaling by the device 110-a and policy decisions made by the paired device 115-a, the device 110-a may then synchronize to a BIS from the AP 105. Further, the device 110-a may establish a communication link 130 with the paired device 115-a (e.g., a SCO link, an eSCO link, an ACL link) to be used for relay of the BIS. The device 110-a may then convert, based on the relay profile, broadcast isochronous data packets of the BIS to SCO packets, eSCO packets, and/or ACL packets, and relay the converted packets to the paired device 115-a via the established communication link 130. In some cases, the relay profile may establish the type of link established between the device 110-a and the paired device 115-a, the type of packet the broadcast isochronous data packets are to be converted to (e.g., SCO, eSCO, ACL), conversion methods, etc.

Generally, the described relay profile (e.g., the LE ISO relay profile) connection may support BIS on paired devices 115-a via relay techniques through device 110-a, and may be implemented in both the paired device 115-a and the device 110-a. More specifically, the LE ISO relay profile may facilitate conversion of incoming broadcast streams on a device 110-a (e.g., a handset) into a format (e.g., an audio format or voice format) supported by paired device 115-a (e.g., a headset). The converted packets (e.g., SCO packets, eSCO packets, ACL packets) may then be relayed or transferred over the relay link 130 (e.g., an eSCO link, ACL link) to the paired device 115-a.

The LE ISO relay profile on device 110-a may obtain the interested broadcast information (e.g., broadcast types supported by paired device 115-a, broadcast types paired device 115-a is interested in receiving, certain broadcasters the paired device 115-a is interested in receiving broadcast from, etc.) though a mobile application of device 110-a and/or a profile of paired device 115-a. Based on the interested broadcasts (e.g., indicated by the broadcast configuration parameters), the LE ISO relay profile on the device 110-a may instruct the controller of device 110-a to start listening for specific broadcasts (e.g., broadcasts of interest).

For example, paired device 115-a may indicate that it is interested in broadcasts associated with museum notifications and/or broadcasts from a specific AP 105 within a museum. The device 110-a may then instruct the controller of device 110-a to start listening for broadcast synchronization indication associated with museum notifications, or associated with a broadcaster ID of the specific museum AP 105. As another example, an application on the device 110-a may indicate that any emergency broadcasts are broadcasts of interest. The device 110-a may then instruct the controller of device 110-a to start listening for broadcast synchronization indication associated with emergency broadcast or associated with a broadcaster ID of an emergency broadcaster.

The device 110-a may discover a broadcast that satisfies the broadcast parameters (e.g., receive a broadcast synchronization indication that matches the specifications of the broadcast configuration parameters) and initiate the LE ISO Relay profile level connection to the paired device 115-a. Device 110-a may then use the LE ISO relay profile to transmit at least a portion of the broadcast synchronization information to the paired device 115-a in an indication of broadcast discovery. The indication of broadcast discovery may include information for paired device 115-a to make a policy decision regarding the broadcast associated with the broadcast synchronization indication (e.g., an accept or reject decision). In some cases, the broadcast synchronization information (e.g., the type of broadcast, who is broadcasting, etc.) may be relayed from the device 110-c to the paired device 115-c using the profile level connection.

In cases where the paired device 115-a accepts the broadcast (e.g., transmits an accept message in response to the indication of broadcast discovery) the device 110-a may initiate the communication link for relay (e.g., the eSCO link, the ACL link). In some cases, the paired device 115-a may accept the broadcast and transmit an accept broadcast relay to the device 110-a using the LE ISO Relay profile connection. The device 110-a may then synchronize with the accepted broadcast (e.g., with the BIS associated with the broadcast synchronization information) and may initiate a transmission link with the paired device 115-*a* for data transmission.

For example, in response to an accept broadcast message, the device 110-*a* may establish a link that the paired device 115-*a* is capable of receiving on, such as an eSCO or ACL link. The configured broadcast parameters (e.g., which may have previously been received from the paired device 115-*a*) may indicate link configurations for the paired device 115-*a* for reception, packet formatting, slot timing, frequency resources, relay conversion methods, or any other information pertaining to the parameters of the paired device 115-*a* to use or receive the relayed data broadcast by the AP 105 (e.g., for the paired device 115-*a* to effectively receive converted broadcast isochronous data packets relayed form the device 110-*a*).

The device 110-*a* may synchronize to the accepted broadcast (e.g., to the BIS) and receive broadcast data packets (e.g., BIS data packets) from the AP 105. The device 110-*a* may convert the broadcast data packets into data packets compatible with the specifications of the paired device 115-*a* (e.g., compatible with the specifications of the paired device's Bluetooth profiles, in accordance with the broadcast configuration parameters) and transmit the converted data packets to the paired device 115-*a*. The LE ISO Relay profile at the device 110-*a* may be responsible for converting the broadcast data packets into data packets that are compatible with the paired device 115-*a*. For example, the paired device 115-*a* may use the broadcast parameters to indicate what data formats the paired device 115-*a* is capable of receiving (e.g., that it is capable of receiving SCO, eSCO, or ACL data packets), and the device 110-*a* may correspondingly convert the incoming BIS data packets into compatible data packets (e.g., into SCO, eSCO, or ACL data packets, or a combination thereof) indicated by the broadcast parameters.

Converting the broadcast data packets into data packets that are compatible with the paired device 115-*a* may refer to converting the broadcast information of a broadcast isochronous data packet into a format supported by the paired device 115-*a*. For example, the converting may include decoding a broadcast isochronous data packet (e.g., according to an ISO profile) and encoding (e.g., or otherwise manipulating) the broadcast information into a different codec (e.g., associated with the LE ISO Relay profile). The codec or format the broadcast isochronous data packet is converted to may be profile specific (e.g., the profile may specify the relay format). In some cases, the broadcast configuration parameters may specify the relay format. In some cases, the converting may additionally or alternatively refer to segmentation and reassembly techniques. For example, in some cases, a single BIS packet may be fragmented into two or more relay packets (e.g., a single BIS packet may be fragmented into SCO packets, eSCO packets, ACL packets, or some combination thereof). In other examples, two or more BIS packets may be combined into a single relay packet (e.g., a SCO packet, eSCO packet, ACL packet).

The LE ISO relay profile at the device 110-*a* may be responsible for converting BIS data packets into a format supported by the paired device 115-*a*. For example, the LE ISO Relay profile may convert the BIS data packets into compatible data packets at the host level, or the host may instruct the controller of the device 110-*a* to automatically convert and relay packets to the paired device 115-*a*. In cases where the LE ISO Relay profile (e.g., the host) instructs the controller to convert the BIS data packets, the host may instruct the controller (e.g., through vendor specific commands) to automatically convert the BIS data packets and transmit or relay the compatible data packets to the paired device 115-*a*. In some cases, if the packet conversion is performed at the controller level, then after the host establishes a compatible link for data transmission to the paired device 115-*a*, the host may go to sleep. The device 110-*a* may transmit the converted data packets over the established compatible link (e.g., an eSCO link or an ACL link) to the paired device 115-*a*.

Beneficially, the techniques described herein allow for LE ISO Relay implementation such that complexities (e.g., of isochronous data handling) are transferred to the device 110-*a*, such that the paired device 115-*a* may receive relayed broadcast streams without implementing additional hardware or features such as advertising extensions, LE ISO channels, etc. Existing paired devices 115 (e.g., existing Bluetooth headsets) may be upgraded (e.g., with the LE ISO Relay profile) to support BIS. The described techniques allow for implementation of BIS being supported by paired devices 115 using existing basic rate/enhanced data rate features (e.g., along with relay techniques with devices 110 that already support isochronous features).

Figure 2:
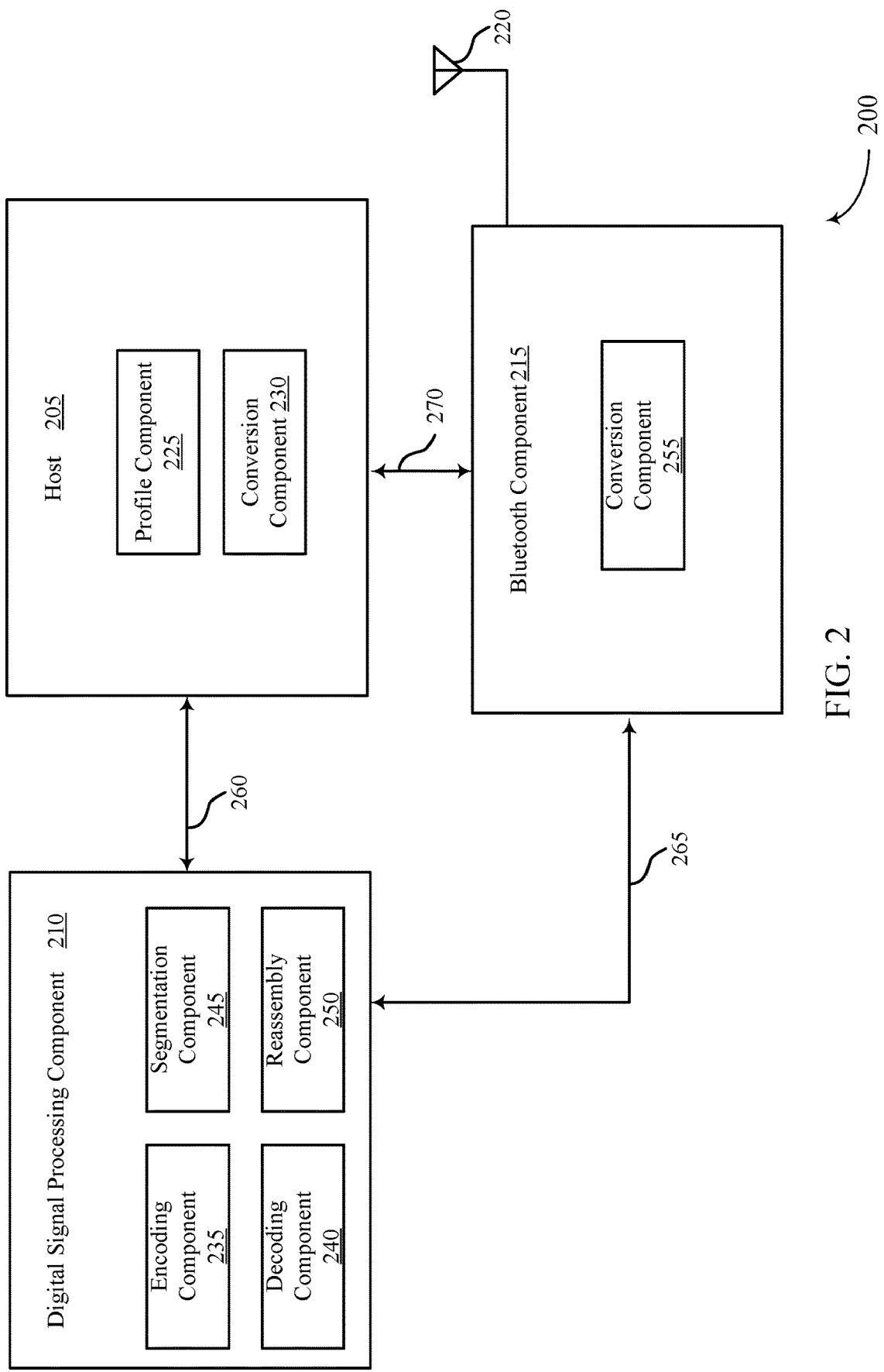
FIG. 2 illustrates an example of a device that supports broadcast isochronous relay for Bluetooth in accordance with aspects of the present disclosure.

FIG. 2 illustrates an example component diagram 200 of a device (e.g., which may be an example of a device 110 or a device 505, as described herein) that supports broadcast isochronous relay for Bluetooth in accordance with aspects of the present disclosure. In some examples, component diagram 200 may implement aspects of system 100. The device illustrated by component diagram 200 may include a host 205, a digital signal processing (DSP) component 210, a Bluetooth component 215, and an antenna 220. Each of these components may be in communication with one another (e.g., via one or more buses or links, such as link 260, link 265, and link 270). In the following description of the component diagram 200, the operations between and functions performed by the host 205, DSP component 210, Bluetooth component 215, and their subcomponents may, in some cases, be performed additionally or alternatively by other components or subcomponents of a device 110 or a device 505. In some cases, certain components or subcomponents may be omitted from the component diagram 200, or other components or subcomponents may be added to the component diagram 200. For example, in some cases, operations of DSP component 210 may, in some cases, be performed at a host level (e.g., Host 205) or a controller level (e.g., Bluetooth component 215).

Host 205 may signal or indicate a vendor specific command (VSC) to initiate communication (e.g., Host 205 may indicate a VSC to Bluetooth component 215 to initiate Bluetooth communication with a paired device). For example, in some cases, host 205 may include suitable logic, circuitry and/or code that may convert data such as GPS data, FM data, cellular data, audio data, etc. to a Bluetooth host controller interface (HCI) packet format by using VSCs. The signaling (e.g., or passing) between components may refer to communication of information across wired and/or wireless links or electrical connections between components where signals or information may be signaled, passed, or communicated amongst the components. In some cases, host 205 may be configured to execute computer-readable instructions stored in a memory to perform various functions (e.g., functions or tasks supporting applications, aspects of DSP, aspects of Bluetooth communication).

DSP component 210 may include suitable logic, circuitry and/or code that may perform DSP. For example, DSP component may include an encoding component 235, a decoding component 240, a segmentation component 245, and a reassembly component 250, each of which may perform aspects of DSP operations performed by a device. Other configurations of a DSP component 210 are contemplated, without departing from the scope of the present disclosure (e.g., DSP component 210 may include additional subcomponents, DSP component 210 may include a subset of the illustrated subcomponents). Each subcomponent of DSP component 210 may include suitable logic, circuitry and/or code to perform their respective functions.

Bluetooth component 215 may include suitable logic, circuitry and/or code that may, for example, control or coordinate Bluetooth communications. For example, Bluetooth component 215 may include a conversion component 255. In some cases, Bluetooth component 215 may reside on a system on chip (SoC) of a device, along with other components (e.g., a WLAN component). Bluetooth component 215 may perform Bluetooth communications with paired devices (e.g., paired Bluetooth devices). For example, conversion component 255 may perform aspects of Bluetooth packet preparation, Bluetooth link monitoring, Bluetooth packet reception, etc.

In some cases, the device may include a single antenna 220. However, in some cases the device may have more than one antenna 220, which may be capable of concurrently and/or simultaneously transmitting or receiving multiple wireless transmissions. In some examples, a device may include a transceiver that may communicate bi-directionally, via one or more antennas 220, wired, or wireless links as described above. For example, a transceiver may represent a wireless transceiver and may communicate bi-directionally with another wireless transceiver (e.g., of a paired device). The transceiver may also include a modem to modulate the packets and provide the modulated packets to the antennas 220 for transmission, and to demodulate packets received from the antennas 220.

In accordance with aspects of the present disclosure, a device may receive broadcast isochronous data packets (e.g., of a BIS) using antenna 220. The device may convert the broadcast isochronous data packets into a format supported by a second device. For example, DSP component 210 may convert the received broadcast isochronous data packets into a format supported by a paired device (e.g., in accordance with an established LE ISO Relay profile). For example, a decoding component 240 may decode or extract broadcast information from a broadcast isochronous data packet, and the decoded broadcast information may be encoded at the encoding component 225 according to a format or codec supported by the paired device. The encoded data may then be signaled (e.g., passed or sent across) to Bluetooth component 215 via link 265, and the Bluetooth component 215 may transmit the encoded data to the paired device (e.g., via antenna 220). Similarly, segmentation component 245 and a reassembly component 250 may perform aspects of segmentation of broadcast isochronous data packets and reassembly of converted packets as discussed herein.

In some cases, the host 205 and/or conversion component 255 may control aspects of the DSP component 210 (e.g., in some cases, some operations of subcomponents of DSP component 210 may be implemented at host 205 and/or conversion component 255, or host 205 and/or conversion component 255 may control other aspects of DSP component 210). For example, in some cases, host 205 may indicate an encoding scheme or codec (e.g., associated with SCO, eSCO, ACL according to the LE ISO Relay profile) to the DSP component 210 (e.g., via link 260), and the DSP component 210 may encode data (e.g., broadcast information decoded from a received broadcast isochronous data packet via decoding component 240) via encoding component 235 according to the indicated encoding scheme.

As discussed above, the LE ISO Relay profile may convert the BIS data packets into compatible data packets at the host level (e.g., at the host 205), or the host 205 may instruct the controller of the device (e.g., a conversion component 255 of Bluetooth component 215) to automatically convert and relay packets to the paired device. The LE ISO Relay profile (e.g., the host 205) may instruct the Bluetooth component 215 or conversion component 255 to convert the BIS data packets through vendor specific commands (e.g., over link 270) to automatically convert the BIS data packets and transmit or relay the compatible data packets to the paired device.

In some cases, if the packet conversion is performed at the Bluetooth component 215 or conversion component 255, then after the host 205 establishes a compatible link for data transmission to the paired device, the host 205 may go to sleep. The wireless device may transmit the converted data packets over the established compatible link (e.g., an eSCO link or an ACL link) to the paired device via antenna 220.

Figure 3:
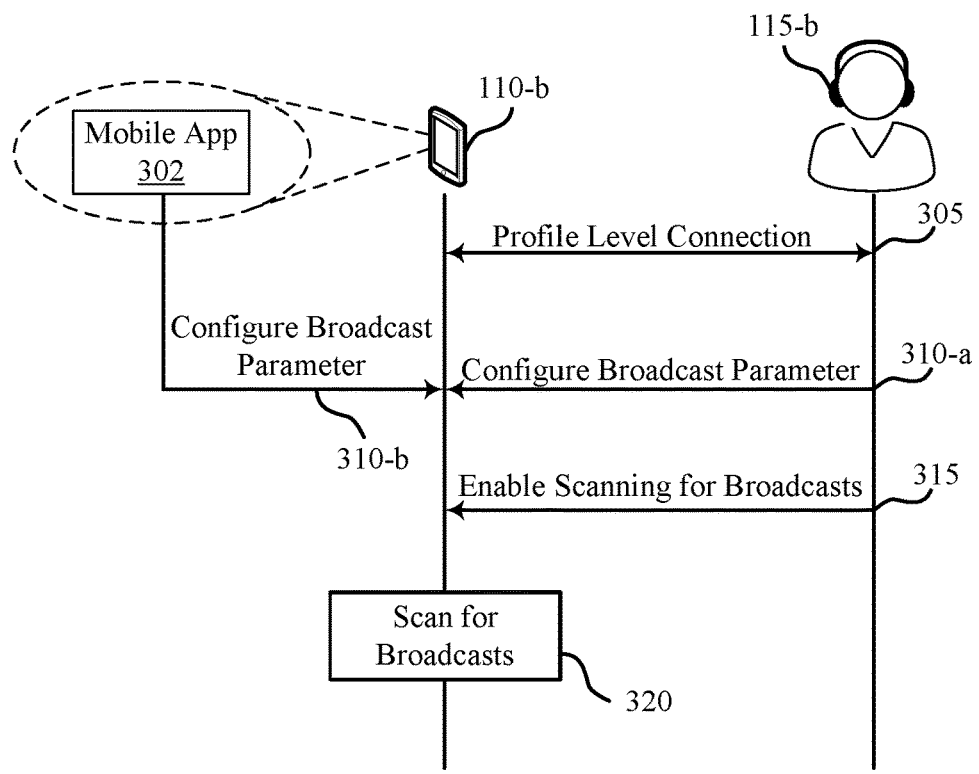
FIGS. 3 and 4 illustrate example process flows that support broadcast isochronous relay for Bluetooth in accordance with aspects of the present disclosure.

FIG. 3 illustrates an example of a process flow 300 that supports broadcast isochronous relay for Bluetooth in accordance with aspects of the present disclosure. In some examples, process flow 300 may implement aspects of system 100. Process flow 300 includes a device 110-b and a paired device 115-b, which may be examples of a device 110 and a paired device 115 as described with reference to FIGS. 1-2. Process flow 300 may illustrate configuration of a device 110-b for receiving broadcasts (e.g., via broadcast parameters configured by an application of device 110-b (e.g., mobile app 302), a paired device 115-b, or both). In the following description of the process flow 300, the operations between the device 110-b and the paired device 115-b (which is an example of a second device that may interact with device 110-b) may be transmitted in a different order than the exemplary order shown, or the operations performed by device 110-b and paired device 115-b may additionally or alternatively be performed in different orders or at different times. In some cases, certain operations may also be omitted from the process flow 300, or other operations may be added to the process flow 300.

At 305, device 110-b and paired device 115-b may establish a profile level connection (e.g., device 110-b and paired device 115-b may establish or initiate a LE ISO relay profile connection). For example, the device 110-b and the paired device 115-b may establish a profile level connection to support relay communication between an AP 105-b and the paired device 115-b (e.g., through device 110-b) in cases where the paired device 115-b may not support reception of broadcast from AP 105-b. For example, the profile level connection may support the relay of BIS to the paired device 115-b. Paired device 115-b may be unable to directly receive BIS data packets based on an incompatibility relating to the paired device 115-b supported Bluetooth profiles. The LE ISO Relay profile connection may provide for relaying of such information through device 110-b.

At 310-a, paired device 115-b may configure broadcast parameters for device 110-b. Additionally or alternatively, at 310-b, mobile app 302 may configure broadcast parameters for device 110-b. In some cases, the paired device 115-b and the mobile app 302 may use the profile level connection established at 305 to configure broadcast parameters for device 110-b (e.g., the paired device 115-a may indicate broadcast configuration parameters to device 110-b using the profile level connection). The configured broadcast parameters may indicate the type of broadcast (e.g., types of broadcast supported or types of broadcast of interest), link configurations required by the paired device 115-*b* for reception, etc.

At 315, the paired device 115-*b* may enable the device 110-*b* to scan for broadcasts (e.g., based on the broadcast parameters configured at 310).

At 320, the device 110-*b* may scan for broadcasts based in part on the configured broadcast parameters. In some cases, the device 110-*b* may scan for broadcasts in response to an enablement transmitted by the paired device 115-*b* at 315. For example, the profile level connection implemented on the device 110-*b* may instruct its controller to monitor specific broadcasts for broadcast synchronization information based in part on the configured broadcast parameters. In some cases, this may include monitoring certain frequencies (e.g., monitoring frequencies associated with the broadcast types or broadcasters indicated by the broadcast configuration parameters), monitoring during certain time periods or time slots (e.g., monitoring time periods or time durations associated with the broadcast types or broadcasters indicated by the broadcast configuration parameters), etc.

Figure 4:
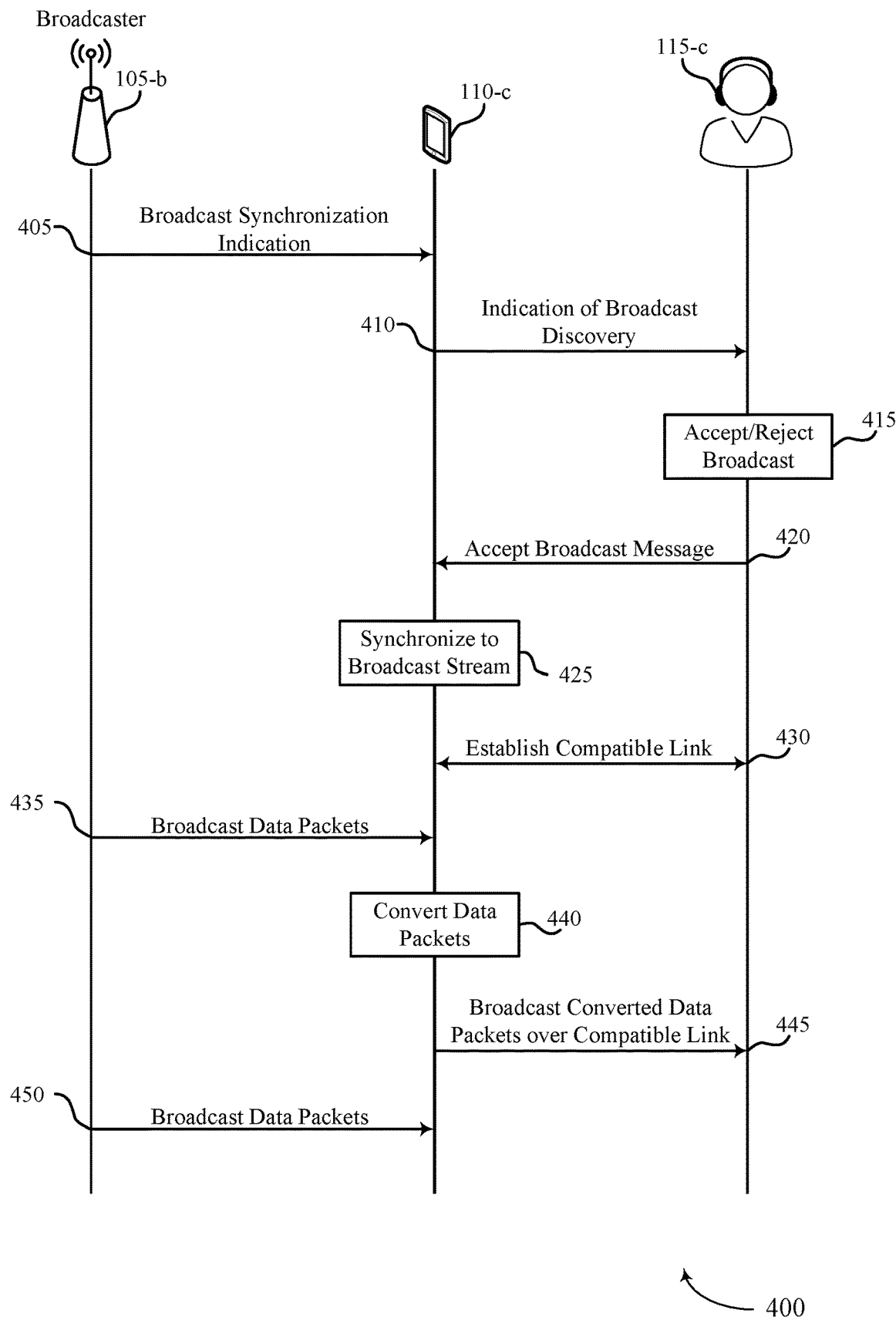

FIG. 4 illustrates an example of a process flow 400 that supports broadcast isochronous relay for Bluetooth in accordance with aspects of the present disclosure. In some examples, process flow 400 may implement aspects of system 100. Process flow 400 includes an AP 105-*b*, a device 110-*c*, and a paired device 115-*c*, which may be examples of an AP 105, a device 110, and a paired device 115 as described with reference to FIGS. 1-3. Process flow 400 may illustrate device 110-*c* synchronization to one or more broadcast streams (e.g., a BIS) as well as device 110-*c* relay of broadcast isochronous data to paired device 115-*c* (e.g., via an established LE ISO relay profile). In the following description of the process flow 400, the operations between the AP 105-*b*, the device 110-*c*, and the paired device 115-*c* may be transmitted in a different order than the exemplary order shown, or the operations performed by AP 105-*b*, device 110-*c*, and paired device 115-*c* may be performed in different orders or at different times. In some cases, certain operations may also be omitted from the process flow 400, or other operations may be added to the process flow 400.

For example, device 110-*c* may scan for broadcasts according to configured broadcast parameters (e.g., as described in more detail above, with reference to FIG. 3). At 405, AP 105-*b* may transmit a broadcast synchronization indication, and device 110-*c* may receive the broadcast synchronization indication (e.g., in accordance with the configured broadcast parameters). The broadcast synchronization indication (e.g., AUX_SYNC_IND+Sync_info) may include or refer to an auxiliary synchronization indication and/or synchronization information.

For example, the broadcast synchronization indication may include information such as the broadcast type (such as voice, audio, etc.), which slots may be associated with the broadcast (e.g., which slots the broadcast information will be broadcast over), the duration of the broadcast, etc. The synchronization information (e.g., which may be included in the indication, or alongside the indication) may include information for how the device 110-*c* may receive the broadcast (e.g., slot information, frequency information, precoding information, etc.), the type of broadcast (e.g., emergency signal, security alert, local notification, etc.), broadcast encryption information, who is broadcasting (e.g., a broadcast ID of the broadcaster or the ID of AP 105-*b*), etc.

At 410, the device 110-*c* may transmit at least a portion of the broadcast synchronization information received at 405 (e.g., the type of broadcast, who is broadcasting, etc.) to the paired device 115-*c* in an indication of broadcast discovery. The indication of broadcast discovery may include information for paired device 115-*c* to make a policy decision regarding the broadcast associated with the broadcast synchronization indication (e.g., an accept or reject decision at 415). In some cases, the broadcast synchronization information may be relayed from the device 110-*c* to the paired device 115-*c* using the profile level connection.

At 415, the paired device 115-*c* may accept or reject the broadcast based on the indication of broadcast discovery received at 410. In some cases, the paired device 115-*c* may accept or reject the broadcast based on some policy decision.

At 420, in cases where the paired device 115-*c* accepts the broadcast or indicates the paired device 115-*c* would like to establish the relay to receive the broadcast, the paired device 115-*c* may transmit an accept broadcast message to the device 110-*c* to indicate that the broadcast associated with the broadcast synchronization information transmitted to the paired device 115-*c* at 410 is accepted. In some cases, the accept broadcast decision is transmitted to the device 110-*c* using the profile level connection.

At 425, device 110-*c* may synchronize to the broadcast stream associated with the accepted broadcast. In some cases, the device 110-*c* may synchronize to the broadcast stream in response to receiving an accept broadcast message at 420.

At 430, the device 110-*c* may establish a compatible link to the paired device 115-*c* for data transmission. For example, paired device 115-*c* may support communication over certain communication links (e.g., paired device 115-*c* may be capable of receiving on certain links based on, for example, supported Bluetooth profiles). For example, paired device 115-*c* may support communication over an eSCO link, over an ACL link, or both. Thus, in the present example, the device 110-*c* may establish an eSCO or an ACL link, or both, to the paired device 115-*c*.

At 435, the AP 105-*b* may transmit broadcast data packets and the device 110-*c* may receive the broadcast data packets. In some cases, the broadcast data packets may be BIS data packets. In some cases, the broadcast data packets (e.g., the BIS data packets) may be incompatible with the paired device 115-*c* (e.g., paired device 115-*c* may not support reception of the BIS data formatting based on the headset's 115-*b* supported Bluetooth profiles).

At 440, the device 110-*c* may convert the data packets according to the profile level connection (e.g., according to the broadcast parameters, the established link with the receiving Bluetooth device, etc.). In some cases, the profile level connection at the device 110-*c* is responsible to convert the broadcast data packets into data packets compatible with the paired device 115-*c*. For example, paired device 115-*c* may be compatible with data packets with certain formatting, such as SCO data packets, eSCO data packets, or ACL data packets. In some cases, the AP 105-*b* may broadcast data packets formatted for BIS to the device 110-*c*, which may then convert the BIS data packets into SCO, eSCO, or ACL data packets, or a combination thereof.

The profile level connection may convert the BIS data packets into compatible data packets at the host level or it may instruct the controller of the device 110-*c* to do so. In the case in which the profile level connection instructs the controller to convert the BIS data packets, the profile level connection may instruct the controller through vendor specific commands to automatically convert the BIS data packets and transmit the compatible data packets to the paired device 115-*c*. In some cases, if the packet conversion is performed at the controller level, then after the host establishes a compatible link for data transmission to the paired device 115-c, the host may go to sleep.

At 445, the wireless device may transmit the converted data packets over the compatible link established at 430. The paired device 115-c may receive and use the converted data packets (e.g., paired device 115-c may receive and use the converted data packets based in part on the headset's 115-b Bluetooth profiles).

At 450, the AP 105-b may continue to broadcast data packets to the device 110-c, which may be converted and transmitted to the paired device 115-c as in 440 and 445, respectively.

Figure 5:
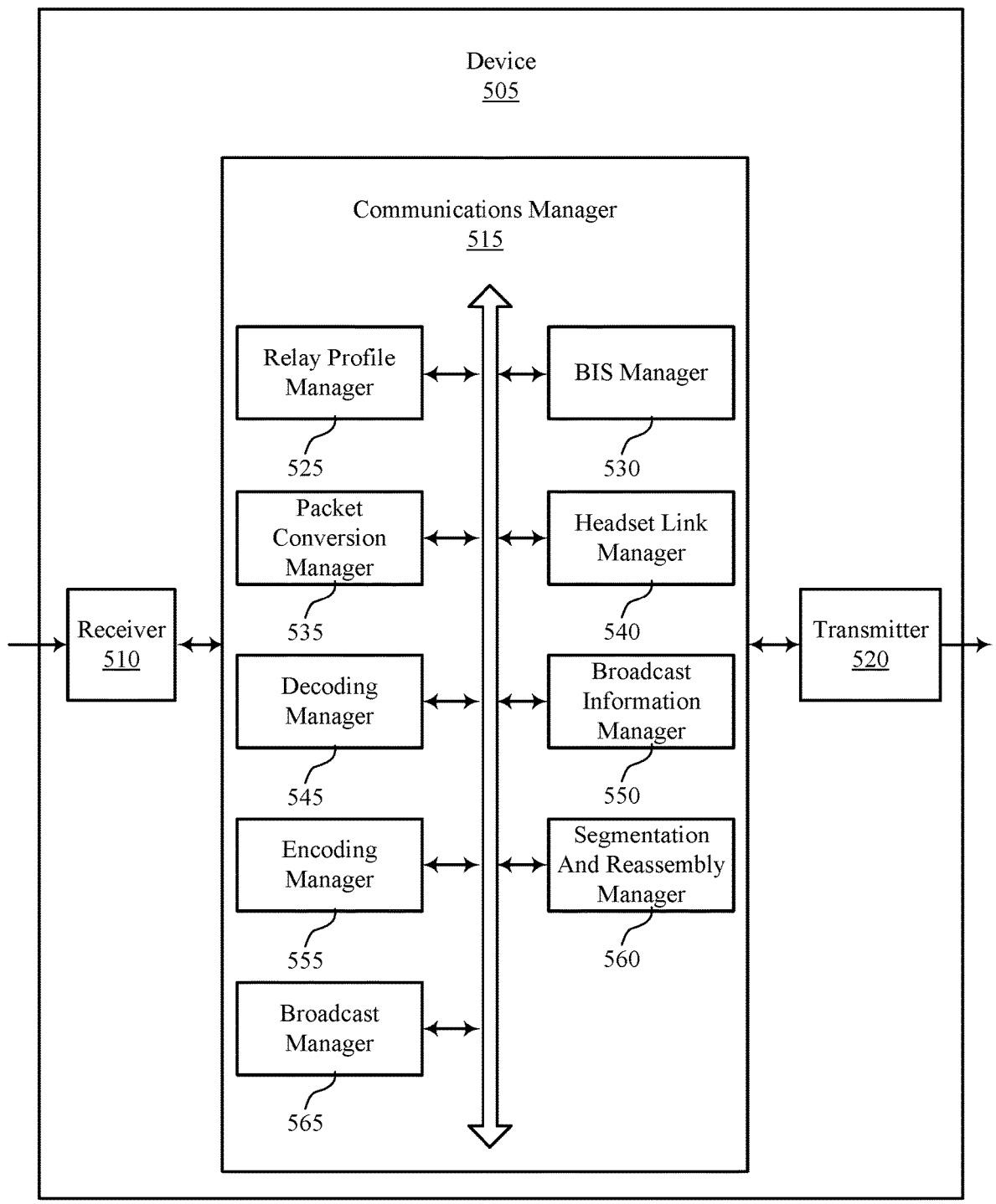
FIG. 5 shows a component diagram of a device that supports broadcast isochronous relay for Bluetooth in accordance with aspects of the present disclosure.

FIG. 5 shows a component diagram 500 of a device 505 that supports broadcast isochronous relay for Bluetooth in accordance with aspects of the present disclosure. The device 505 may be an example of aspects of a device as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to broadcast isochronous relay for Bluetooth, etc.). Information may be passed on to other components of the device 505. The receiver 510 may be an example of aspects of the transceiver 620 described with reference to FIG. 6. The receiver 510 may utilize a single antenna or a set of antennas.

The communications manager 515 may establish a communication link with a Bluetooth device using a relay profile, receive a broadcast isochronous data packet from a second device, convert, based on the relay profile, the broadcast isochronous data packet to a SCO packet, an eSCO packet, or an ACL packet, and transmit the SCO packet, the eSCO packet, or the ACL packet to the Bluetooth device based on the conversion. The communications manager 515 may be an example of aspects of the communications manager 610 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

For example, the communications manager 515 may include a relay profile manager 525, a BIS manager 530, a packet conversion manager 535, a headset link manager 540, a decoding manager 545, a broadcast information manager 550, an encoding manager 555, a segmentation and reassembly manager 560, and a broadcast manager 565. Each of these components may communicate, directly or indirectly, with one another (e.g., via one or more buses).

The relay profile manager 525 may establish a communication link with a Bluetooth device using a relay profile.

The BIS manager 530 may receive a broadcast isochronous data packet from a second device. In some examples, the BIS manager 530 may receive a broadcast synchronization indication from the second device. In some examples, the BIS manager 530 may synchronize to a BIS from the second device based on the received broadcast accept message and the received broadcast synchronization indication, where the broadcast isochronous data packet is received based on the synchronization. In some cases, a broadcast type, one or more broadcast configuration parameters, one or more BIS synchronization parameters, one or more encryption parameters, or some combination thereof.

The packet conversion manager 535 may convert, based on the relay profile, the broadcast isochronous data packet to a SCO packet, an eSCO packet, or an ACL packet. In some examples, the packet conversion manager 535 may convert, at a host of the device, the broadcast isochronous data packet to the SCO packet, the eSCO packet, or the ACL packet based on the relay profile. In some examples, the packet conversion manager 535 may instruct, by the host of the device, a controller of the device to convert the broadcast isochronous data packet to the SCO packet, the eSCO packet, or the ACL packet via at least one command based on the relay profile.

The headset link manager 540 may transmit the SCO packet, the eSCO packet, or the ACL packet to the Bluetooth device based on the conversion. In some examples, the headset link manager 540 may establish an SCO communication link, an eSCO communication link, or an ACL communication link with the Bluetooth device based on the received broadcast accept message, where the SCO packet, the eSCO packet, or the ACL packet is transmitted based on the establishment.

The decoding manager 545 may decode the received broadcast isochronous data packet.

The broadcast information manager 550 may identify broadcast information based on the decoding.

The encoding manager 555 may encode the broadcast information based on a SCO format, an eSCO format, or an ACL format, where the SCO packet, the eSCO packet, or the ACL packet is based on the encoding.

The segmentation and reassembly manager 560 may fragment the received broadcast isochronous data packet, where the SCO packet, the eSCO packet, or the ACL packet is based on the fragmenting. In some examples, the segmentation and reassembly manager 560 may combine the received broadcast isochronous data packet with one or more other broadcast isochronous data packets, where the SCO packet, the eSCO packet, or the ACL packet is based on the combining.

The broadcast manager 565 may receive one or more broadcast parameters from a mobile application of the device, or the Bluetooth device, or both, where the broadcast isochronous data packet is converted into the SCO packet, the eSCO packet, or the ACL packet based on the one or more broadcast parameters. In some examples, the broadcast manager 565 may transmit, using the relay profile, an indication of a broadcast discovery to the Bluetooth device based on the broadcast synchronization indication.

In some examples, the broadcast manager 565 may receive a broadcast accept message or a broadcast reject message from the Bluetooth device based on the transmitted indication of the broadcast discovery. In some cases, the one or more broadcast parameters include one or more types of broadcast supported by the Bluetooth device, one or more broadcast streams of interest to the Bluetooth device, one or more broadcast configuration parameters, or some combination thereof. In some cases, where the indication of the broadcast discovery includes: the broadcast type, the one or more broadcast configuration parameters, an identifier of the second device, or some combination thereof.

The transmitter 520 may transmit signals generated by other components of the device 505. In some examples, the transmitter 520 may be collocated with a receiver 510 in a transceiver component. For example, the transmitter 520 may be an example of aspects of the transceiver 620 described with reference to FIG. 6. The transmitter 520 may utilize a single antenna or a set of antennas.

Figure 6:
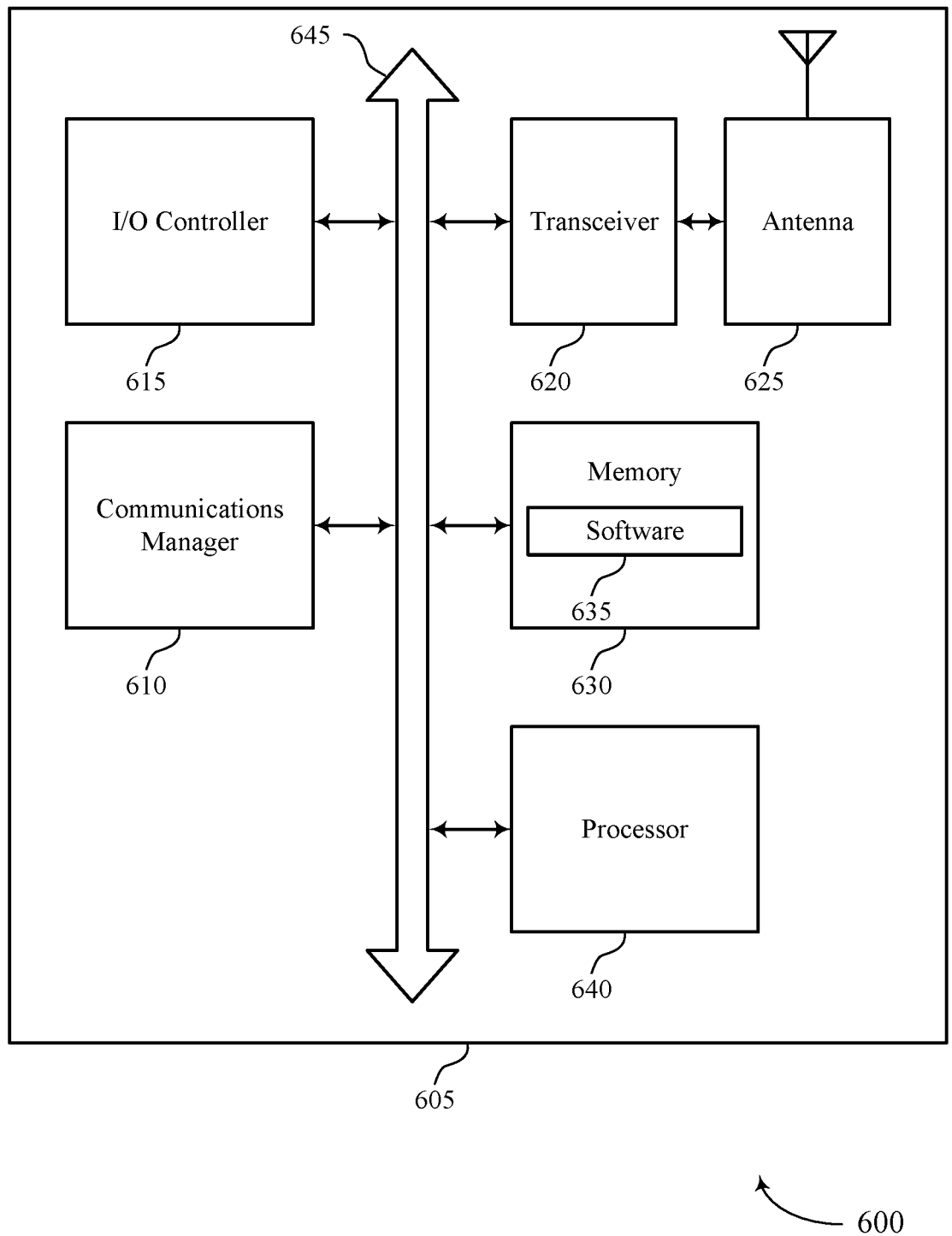
FIG. 6 shows a diagram of a system including a device that supports broadcast isochronous relay for Bluetooth in accordance with aspects of the present disclosure.

FIG. 6 shows a diagram of a system 600 including a device 605 that supports broadcast isochronous relay for Bluetooth in accordance with aspects of the present disclosure. The device 605 may be an example of or include the components of device 505 or a device 110 as described herein. The device 605 may include components for bi-directional voice and data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The communications manager 610 may establish a communication link with a Bluetooth device using a relay profile, receive a broadcast isochronous data packet from a second device, convert, based on the relay profile, the broadcast isochronous data packet to a SCO packet, an eSCO packet, or an ACL packet, and transmit the SCO packet, the eSCO packet, or the ACL packet to the Bluetooth device based on the conversion.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include a single antenna 625. However, in some cases the device may have more than one antenna 625, which may be capable of concurrently transmitting or receiving multiple wireless transmissions.

The memory 630 may include RAM and ROM. The memory 630 may store computer-readable, computer-executable software 635 including instructions that, when executed, cause the processor to perform various functions described herein. In some cases, the memory 630 may contain, among other things, a BIOS which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting broadcast isochronous relay for Bluetooth).

The software 635 may include instructions to implement aspects of the present disclosure, including instructions to support wireless communications. The software 635 may be stored in a non-transitory computer-readable medium such as system memory or other type of memory. In some cases, the software 635 may not be directly executable by the processor 640 but may cause a computer (e.g., when compiled and executed) to perform functions described herein.

Figure 7:
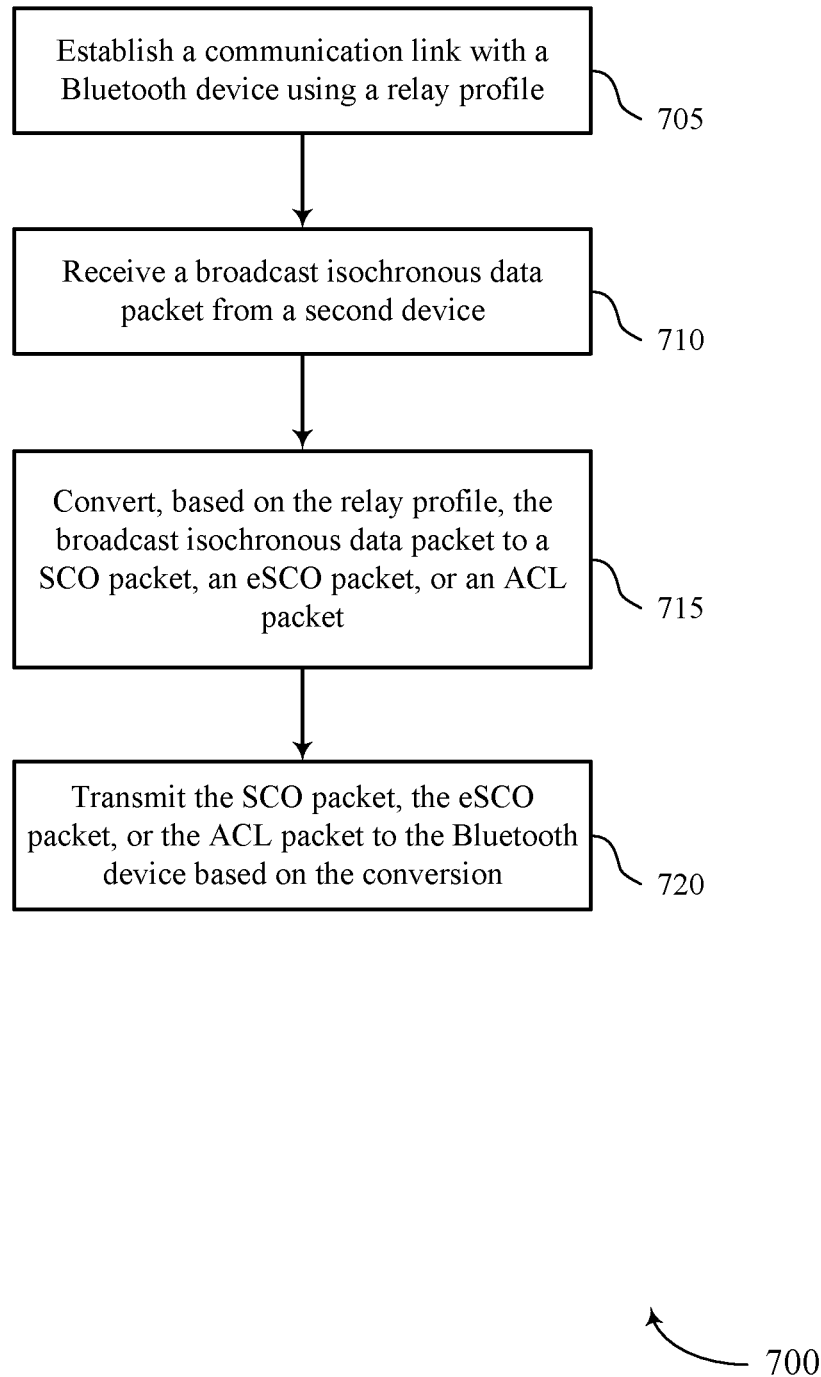
FIGS. 7 through 10 show flowcharts illustrating methods that support broadcast isochronous relay for Bluetooth in accordance with aspects of the present disclosure.

FIG. 7 shows a flowchart illustrating a method 700 that supports broadcast isochronous relay for Bluetooth in accordance with aspects of the present disclosure. The operations of method 700 may be implemented by a device or its components as described herein. For example, the operations of method 700 may be performed by a communications manager as described with reference to FIGS. 5 through 6. In some examples, a device may execute a set of instructions to control the functional elements of the device to perform the functions described below. Additionally or alternatively, a device may perform aspects of the functions described below using special-purpose hardware.

At 705, the device may establish a communication link with a Bluetooth device using a relay profile. The operations of 705 may be performed according to the methods described herein. In some examples, aspects of the operations of 705 may be performed by a relay profile manger as described with reference to FIGS. 5 through 6.

At 710, the device may receive a broadcast isochronous data packet from a second device. The operations of 710 may be performed according to the methods described herein. In some examples, aspects of the operations of 710 may be performed by a BIS manager as described with reference to FIGS. 5 through 6.

At 715, the device may convert, based on the relay profile, the broadcast isochronous data packet to a SCO packet, an eSCO packet, or an ACL packet. The operations of 715 may be performed according to the methods described herein. In some examples, aspects of the operations of 715 may be performed by a packet conversion manager as described with reference to FIGS. 5 through 6.

At 720, the device may transmit the SCO packet, the eSCO packet, or the ACL packet to the Bluetooth device based on the conversion. The operations of 720 may be performed according to the methods described herein. In some examples, aspects of the operations of 720 may be performed by a headset link manager as described with reference to FIGS. 5 through 6.

Figure 8:
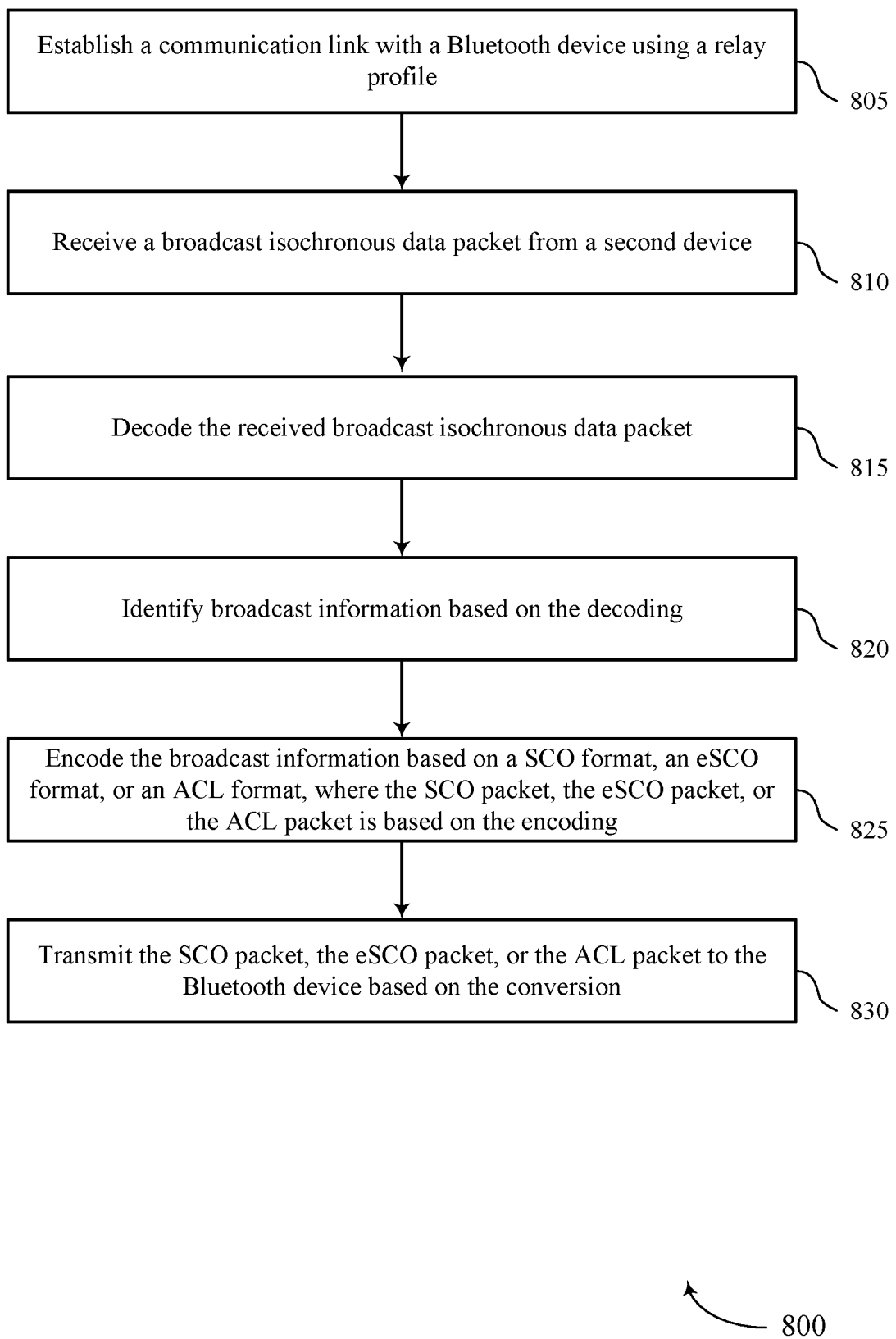

FIG. 8 shows a flowchart illustrating a method 800 that supports broadcast isochronous relay for Bluetooth in accordance with aspects of the present disclosure. The operations of method 800 may be implemented by a device or its components as described herein. For example, the operations of method 800 may be performed by a communications manager as described with reference to FIGS. 5 through 6. In some examples, a device may execute a set of instructions to control the functional elements of the device to perform the functions described below. Additionally or alternatively, a device may perform aspects of the functions described below using special-purpose hardware.

At 805, the device may establish a communication link with a Bluetooth device using a relay profile. The operations of 805 may be performed according to the methods described herein. In some examples, aspects of the operations of 805 may be performed by a relay profile manger as described with reference to FIGS. 5 through 6.

At 810, the device may receive a broadcast isochronous data packet from a second device. The operations of 810 may be performed according to the methods described herein. In some examples, aspects of the operations of 810 may be performed by a BIS manager as described with reference to FIGS. 5 through 6.

At 815, the device may decode the received broadcast isochronous data packet. The operations of 815 may be performed according to the methods described herein. In some examples, aspects of the operations of 815 may be performed by a decoding manager as described with reference to FIGS. 5 through 6.

At 820, the device may identify broadcast information based on the decoding. The operations of 820 may be performed according to the methods described herein. In some examples, aspects of the operations of 820 may be performed by a broadcast information manager as described with reference to FIGS. 5 through 6.

At 825, the device may encode the broadcast information based on a SCO format, an eSCO format, or an ACL format, where the SCO packet, the eSCO packet, or the ACL packet is based on the encoding. The operations of 825 may be performed according to the methods described herein. In some examples, aspects of the operations of 825 may be performed by an encoding manager as described with reference to FIGS. 5 through 6.

At 830, the device may transmit the SCO packet, the eSCO packet, or the ACL packet to the Bluetooth device based on the conversion. The operations of 830 may be performed according to the methods described herein. In some examples, aspects of the operations of 830 may be performed by a headset link manager as described with reference to FIGS. 5 through 6.

Figure 9:
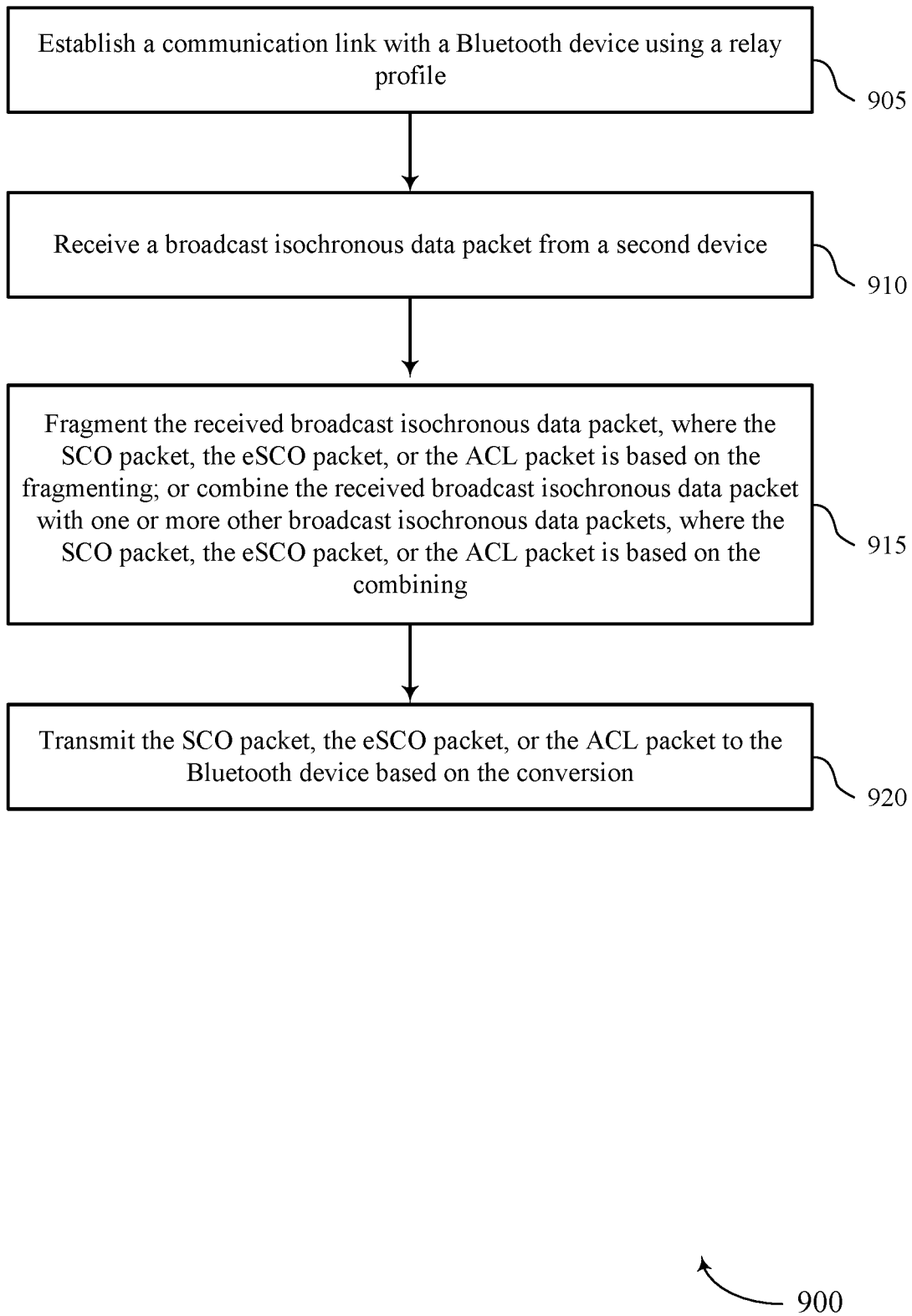

FIG. 9 shows a flowchart illustrating a method 900 that supports broadcast isochronous relay for Bluetooth in accordance with aspects of the present disclosure. The operations of method 900 may be implemented by a device or its components as described herein. For example, the operations of method 900 may be performed by a communications manager as described with reference to FIGS. 5 through 6. In some examples, a device may execute a set of instructions to control the functional elements of the device to perform the functions described below. Additionally or alternatively, a device may perform aspects of the functions described below using special-purpose hardware.

At 905, the device may establish a communication link with a Bluetooth device using a relay profile. The operations of 905 may be performed according to the methods described herein. In some examples, aspects of the operations of 905 may be performed by a relay profile manger as described with reference to FIGS. 5 through 6.

At 910, the device may receive a broadcast isochronous data packet from a second device. The operations of 910 may be performed according to the methods described herein. In some examples, aspects of the operations of 910 may be performed by a BIS manager as described with reference to FIGS. 5 through 6.

At 915, the device may fragment the received broadcast isochronous data packet, where the SCO packet, the eSCO packet, or the ACL packet is based on the fragmenting or the device may combine the received broadcast isochronous data packet with one or more other broadcast isochronous data packets, where the SCO packet, the eSCO packet, or the ACL packet is based on the combining. The operations of 915 may be performed according to the methods described herein. In some examples, aspects of the operations of 915 may be performed by a segmentation and reassembly manager as described with reference to FIGS. 5 through 6.

At 920, the device may transmit the SCO packet, the eSCO packet, or the ACL packet to the Bluetooth device based on the conversion. The operations of 920 may be performed according to the methods described herein. In some examples, aspects of the operations of 920 may be performed by a headset link manager as described with reference to FIGS. 5 through 6.

Figure 10:
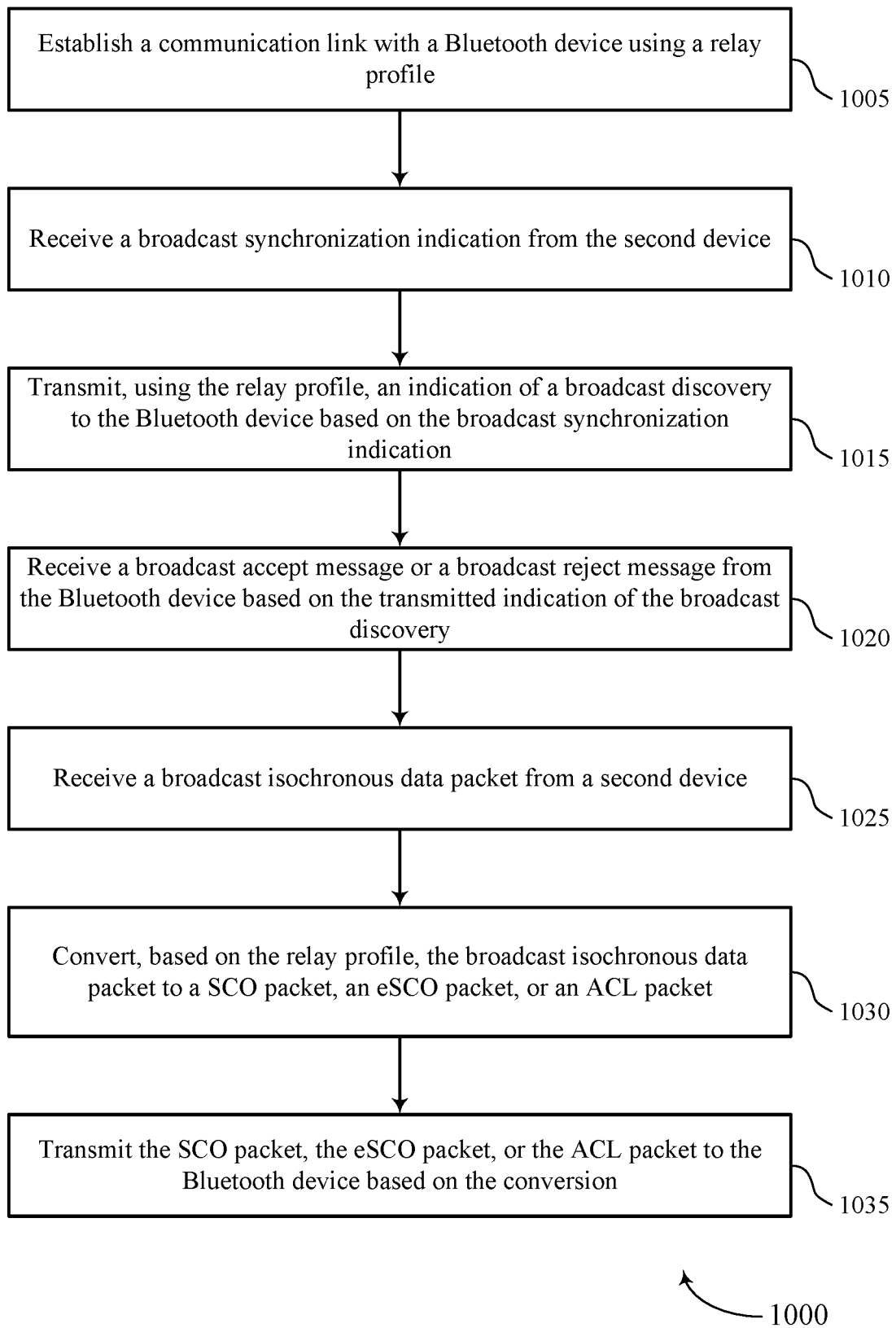

FIG. 10 shows a flowchart illustrating a method 1000 that supports broadcast isochronous relay for Bluetooth in accordance with aspects of the present disclosure. The operations of method 1000 may be implemented by a device or its components as described herein. For example, the operations of method 1000 may be performed by a communications manager as described with reference to FIGS. 5 through 6. In some examples, a device may execute a set of instructions to control the functional elements of the device to perform the functions described below. Additionally or alternatively, a device may perform aspects of the functions described below using special-purpose hardware.

At 1005, the device may establish a communication link with a Bluetooth device using a relay profile. The operations of 1005 may be performed according to the methods described herein. In some examples, aspects of the operations of 1005 may be performed by a relay profile manger as described with reference to FIGS. 5 through 6.

At 1010, the device may receive a broadcast synchronization indication from the second device. The operations of 1010 may be performed according to the methods described herein. In some examples, aspects of the operations of 1010 may be performed by a BIS manager as described with reference to FIGS. 5 through 6.

At 1015, the device may transmit, using the relay profile, an indication of a broadcast discovery to the Bluetooth device based on the broadcast synchronization indication. The operations of 1015 may be performed according to the methods described herein. In some examples, aspects of the operations of 1015 may be performed by a broadcast manager as described with reference to FIGS. 5 through 6.

At 1020, the device may receive a broadcast accept message or a broadcast reject message from the Bluetooth device based on the transmitted indication of the broadcast discovery. The operations of 1020 may be performed according to the methods described herein. In some examples, aspects of the operations of 1020 may be performed by a broadcast manager as described with reference to FIGS. 5 through 6.

At 1025, the device may receive a broadcast isochronous data packet from a second device. The operations of 1025 may be performed according to the methods described herein. In some examples, aspects of the operations of 1025 may be performed by a BIS manager as described with reference to FIGS. 5 through 6.

At 1030, the device may convert, based on the relay profile, the broadcast isochronous data packet to a SCO packet, an eSCO packet, or an ACL packet. The operations of 1030 may be performed according to the methods described herein. In some examples, aspects of the operations of 1030 may be performed by a packet conversion manager as described with reference to FIGS. 5 through 6.

At 1035, the device may transmit the SCO packet, the eSCO packet, or the ACL packet to the Bluetooth device based on the conversion. The operations of 1035 may be performed according to the methods described herein. In some examples, aspects of the operations of 1035 may be performed by a headset link manager as described with reference to FIGS. 5 through 6.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in component diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative components and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication at a first device, comprising:
   receiving a broadcast synchronization indication from a second device;
   transmitting, using the relay profile, an indication of a broadcast discovery to the Bluetooth device based at least in part on the broadcast synchronization indication;
   receiving a broadcast accept message or a broadcast reject message from the Bluetooth device based at least in part on the transmitted indication of the broadcast discovery;
   synchronizing to a broadcast isochronous stream (BIS) from the second device based at least in part on the received broadcast synchronization indication;
   establishing a communication link with a Bluetooth device using a relay profile;
   receiving a broadcast isochronous data packet from the second device based at least in part on synchronizing to the BIS;
   receiving one or more broadcast parameters from a mobile application of the first device, or the Bluetooth device, or both;
   converting, based at least in part on the relay profile and the one or more broadcast parameters, the broadcast isochronous data packet to a synchronous connection oriented (SCO) packet, an enhanced synchronous connection oriented (eSCO) packet, or an asynchronous connection less (ACL) packet; and
   transmitting the SCO packet, the eSCO packet, or the ACL packet to the Bluetooth device based at least in part on the conversion.

2. The method of claim 1, wherein converting the broadcast isochronous data packet to the SCO packet, the eSCO packet, or the ACL packet comprises:
   decoding the received broadcast isochronous data packet;
   identifying broadcast information based at least in part on the decoding; and
   encoding the broadcast information based at least in part on a SCO format, an eSCO format, or an ACL format, wherein the SCO packet, the eSCO packet, or the ACL packet is based at least in part on the encoding.

3. The method of claim 1, wherein converting the broadcast isochronous data packet to the SCO packet, the eSCO packet, or the ACL packet comprises:
   fragmenting the received broadcast isochronous data packet, wherein the SCO packet, the eSCO packet, or the ACL packet is based at least in part on the fragmenting; or
   combining the received broadcast isochronous data packet with one or more other broadcast isochronous data packets, wherein the SCO packet, the eSCO packet, or the ACL packet is based at least in part on the combining.

4. The method of claim 1, wherein the one or more broadcast parameters comprise one or more types of broadcast supported by the Bluetooth device, one or more broadcast streams of interest to the Bluetooth device, one or more broadcast configuration parameters, or some combination thereof.

5. The method of claim 1, further comprising:
   establishing an SCO communication link, an eSCO communication link, or an ACL communication link with the Bluetooth device based at least in part on the received broadcast accept message, wherein the SCO packet, the eSCO packet, or the ACL packet is transmitted based at least in part on the establishment.

6. The method of claim 1, further comprising:
   synchronizing to the broadcast isochronous stream (BIS) from the second device based at least in part on the received broadcast accept message, wherein the broadcast isochronous data packet is received based at least in part on the synchronization.

7. The method of claim 1, wherein the broadcast synchronization indication comprises:
   a broadcast type, one or more broadcast configuration parameters, one or more broadcast isochronous stream (BIS) synchronization parameters, one or more encryption parameters, or some combination thereof; and
   wherein the indication of the broadcast discovery comprises: the broadcast type, the one or more broadcast configuration parameters, an identifier of the second device, or some combination thereof.

8. The method of claim 1, wherein converting the broadcast isochronous data packet to the SCO packet, the eSCO packet, or the ACL packet comprises:

converting, at a host of the first device, the broadcast isochronous data packet to the SCO packet, the eSCO packet, or the ACL packet based at least in part on the relay profile; or instructing, by the host of the first device, a controller of the first device to convert the broadcast isochronous data packet to the SCO packet, the eSCO packet, or the ACL packet via at least one command based at least in part on the relay profile.

9. An apparatus for wireless communication at a first device, comprising:
   a processor,
   memory in electronic communication with the processor; and
   instructions stored in the memory and executable by the processor to cause the apparatus to:
   establish a communication link with a Bluetooth device using a relay profile;
   receive a broadcast synchronization indication from a second device;
   transmit, using the relay profile, an indication of a broadcast discovery to the Bluetooth device based at least in part on the broadcast synchronization indication;
   receive a broadcast accept message or a broadcast reject message from the Bluetooth device based at least in part on the transmitted indication of the broadcast discovery;
   synchronize to a broadcast isochronous stream (BIS) from the second device based at least in part on the received broadcast synchronization indication;
   receive a broadcast isochronous data packet from the second device based at least in part on synchronizing to the BIS;
   receive one or more broadcast parameters from a mobile application of the first device, or the Bluetooth device, or both;
   convert, based at least in part on the relay profile and the one or more broadcast parameters, the broadcast isochronous data packet to a synchronous connection oriented (SCO) packet, an enhanced synchronous connection oriented (eSCO) packet, or an asynchronous connection less (ACL) packet; and
   transmit the SCO packet, the eSCO packet, or the ACL packet to the Bluetooth device based at least in part on the conversion.

10. The apparatus of claim 9, wherein the instructions to convert the broadcast isochronous data packet to the SCO packet, the eSCO packet, or the ACL packet are executable by the processor to cause the apparatus to:
    decode the received broadcast isochronous data packet;
    identify broadcast information based at least in part on the decoding; and
    encode the broadcast information based at least in part on a SCO format, an eSCO format, or an ACL format, wherein the SCO packet, the eSCO packet, or the ACL packet is based at least in part on the encoding.

11. The apparatus of claim 9, wherein the instructions to convert the broadcast isochronous data packet to the SCO packet, the eSCO packet, or the ACL packet are executable by the processor to cause the apparatus to:
    fragment the received broadcast isochronous data packet, wherein the SCO packet, the eSCO packet, or the ACL packet is based at least in part on the fragmenting; or
    combine the received broadcast isochronous data packet with one or more other broadcast isochronous data packets, wherein the SCO packet, the eSCO packet, or the ACL packet is based at least in part on the combining.

12. The apparatus of claim 9, wherein the one or more broadcast parameters comprise one or more types of broadcast supported by the Bluetooth device, one or more broadcast streams of interest to the Bluetooth device, one or more broadcast configuration parameters, or some combination thereof.

13. The apparatus of claim 9, wherein the instructions are further executable by the processor to cause the apparatus to:
    establish an SCO communication link, an eSCO communication link, or an ACL communication link with the Bluetooth device based at least in part on the received broadcast accept message, wherein the SCO packet, the eSCO packet, or the ACL packet is transmitted based at least in part on the establishment, or
    synchronize to the broadcast isochronous stream (BIS) from the second device based at least in part on the received broadcast accept message, wherein the broadcast isochronous data packet is received based at least in part on the synchronization.

14. The apparatus of claim 9, wherein the broadcast synchronization indication comprises:
    a broadcast type, one or more broadcast configuration parameters, one or more broadcast isochronous stream (BIS) synchronization parameters, one or more encryption parameters, or some combination thereof; and
    wherein the indication of the broadcast discovery comprises the broadcast type, or the one or more broadcast configuration parameters, or an identifier of the second device, or any combination thereof.

15. The apparatus of claim 9, wherein the instructions to convert the broadcast isochronous data packet to the SCO packet, the eSCO packet, or the ACL packet are executable by the processor to cause the apparatus to:
    convert, at a host of the first device, the broadcast isochronous data packet to the SCO packet, the eSCO packet, or the ACL packet based at least in part on the relay profile; or
    instruct, by the host of the first device, a controller of the first device to convert the broadcast isochronous data packet to the SCO packet, the eSCO packet, or the ACL packet via at least one command based at least in part on the relay profile.

16. An apparatus for wireless communication at a first device, comprising:
    means for establishing a communication link with a Bluetooth device using a relay profile;
    means for receiving a broadcast synchronization indication from a second device;
    means for transmitting, using the relay profile, an indication of a broadcast discovery to the Bluetooth device based at least in part on the broadcast synchronization indication;
    means for receiving a broadcast accept message or a broadcast reject message from the Bluetooth device based at least in part on the transmitted indication of the broadcast discovery;
    means for synchronizing to a broadcast isochronous stream (BIS) from the second device based at least in part on the received broadcast synchronization indication;
    means for receiving a broadcast isochronous data packet from the second device based at least in part on synchronizing to the BIS;

means for receiving one or more broadcast parameters from a mobile application of the first device, or the Bluetooth device, or both;

means for converting, based at least in part on the relay profile and the one or more broadcast parameters, the broadcast isochronous data packet to a synchronous connection oriented (SCO) packet, an enhanced synchronous connection oriented (eSCO) packet, or an asynchronous connection less (ACL) packet; and means for transmitting the SCO packet, the eSCO packet, or the ACL packet to the Bluetooth device based at least in part on the conversion.

* * * * *